US011444890B2

United States Patent
Zakin et al.

(10) Patent No.: US 11,444,890 B2
(45) Date of Patent: Sep. 13, 2022

(54) METHOD AND DEVICE FOR IMPROVING BANDWIDTH UTILIZATION IN A COMMUNICATION NETWORK

(71) Applicant: DRIVENETS LTD., Raanana (IL)

(72) Inventors: Ori Zakin, Sde Varburg (IL); Amir Krayden, Even Yehuda (IL); Or Sadeh, Pardes Hanna (IL); Gregory Freilikhman, Or Akiva (IL)

(73) Assignee: DRIVENETS LTD., Raanana (IL)

( * ) Notice: Subject to any disclaimer, the term of this patent is extended or adjusted under 35 U.S.C. 154(b) by 114 days.

(21) Appl. No.: 16/964,090

(22) PCT Filed: Jan. 19, 2019

(86) PCT No.: PCT/IL2019/050075
§ 371 (c)(1),
(2) Date: Jul. 22, 2020

(87) PCT Pub. No.: WO2019/145938
PCT Pub. Date: Aug. 1, 2019

(65) Prior Publication Data
US 2020/0351222 A1 Nov. 5, 2020

Related U.S. Application Data

(60) Provisional application No. 62/622,913, filed on Jan. 28, 2018.

(51) Int. Cl.
*H04L 49/90* (2022.01)
*G06F 13/38* (2006.01)
(Continued)

(52) U.S. Cl.
CPC ........ *H04L 49/9068* (2013.01); *G06F 13/385* (2013.01); *H04L 12/56* (2013.01); *H04L 49/901* (2013.01); *H04L 69/22* (2013.01)

(58) Field of Classification Search
CPC ... H04L 49/9068; H04L 12/56; H04L 49/901; H04L 69/22; H04L 69/12; H04L 69/321; G06F 13/385
See application file for complete search history.

(56) References Cited

U.S. PATENT DOCUMENTS 7,849,208 B2 * 12/2010 Elzur ............... H04L 69/10
709/232
8,640,220 B1 1/2014 Pradeep
(Continued)

FOREIGN PATENT DOCUMENTS

EP 2574000 A2 3/2013
WO 2018198114 A1 11/2018
(Continued)

*Primary Examiner* — Jae Y Lee
(74) *Attorney, Agent, or Firm* — Browdy and Neimark, PLLC

(57) ABSTRACT

A communication system comprising at least one smart network interface card ("NIC") provided with a logic/programmable processor and a local memory, and a computing element, wherein a communication bus is used to connect said smart NIC and said computing element to enable forwarding data there-between, wherein the system is characterized in that said smart NIC is configured to receive data packets, to extract data therefrom and to forward less than all data comprised in the received data packets, to said computing element along said communication bus, and wherein the forwarded data comprises data which is preferably required for making networking decisions that relate to that respective data packet.

13 Claims, 3 Drawing Sheets

(51) Int. Cl.
  *H04L 12/54*     (2022.01)
  *H04L 49/901*    (2022.01)
  *H04L 69/22*     (2022.01)

(56) References Cited

U.S. PATENT DOCUMENTS

| | | |
|---|---|---|
| 2008/0240111 A1 | 10/2008 | Gadelrab |
| 2010/0322249 A1 | 12/2010 | Thathapudi |
| 2015/0249620 A1* | 9/2015 | Folsom .................. G06F 13/42 370/392 |
| 2015/0381494 A1 | 12/2015 | Shoby et al. |
| 2016/0330301 A1 | 11/2016 | Raindel et al. |
| 2016/0381189 A1 | 12/2016 | Caulfield |
| 2017/0250953 A1 | 8/2017 | Jain et al. |
| 2019/0044809 A1* | 2/2019 | Willis .................. G06F 3/0683 |

FOREIGN PATENT DOCUMENTS

| | | |
|---|---|---|
| WO | 2018220613 A1 | 12/2018 |
| WO | 2018229745 A1 | 12/2018 |
| WO | 2019026061 A1 | 2/2019 |
| WO | 2019077602 A1 | 4/2019 |

* cited by examiner

METHOD AND DEVICE FOR IMPROVING BANDWIDTH UTILIZATION IN A COMMUNICATION NETWORK

TECHNICAL FIELD

The present disclosure relates generally to the field of communication network throughput, and in particular, to a device and a method for alleviating bottlenecks in communication networks, thereby enabling achievement of an increase in the communication systems' throughput.

BACKGROUND

Every computer included in a data network, operating either as a client or as a server, requires a network interface card (hereinafter "NIC") in order to access the network. A NIC is usually a separate adapter card that is mounted onto one of the server's motherboard expansion slots. However, most newer computers have the NIC built into the motherboard, in which case a separate card is not required.

For a client computer, one may use an inexpensive built-in NIC, because a client computer is used to connect only one user to the network, contrary to the use of a NIC in a server computer which connects many network users to the server.

Smart NICs may be used in cloud data center servers to boost performance by offloading CPUs in servers by performing network datapath processing. With the recent shift in cloud data center networking driven by software-defined networking (SDN) and network functions virtualization (NFV), a new class of offload NIC is needed—namely a smart NIC.

Specifically, there are three major reasons for which a smart offload NIC, or a smart NIC, would be required:
1) The complexity of the server-based networking data plane has increased dramatically with the introduction of overlay tunneling protocols such as VXLAN, and virtual switching with complex actions.
2) Increasing network interface bandwidths means that performing these functions in software creates an untenable load on the CPU resources, leaving little or no CPU left over to run applications.
3) A key requirement of SDN is that the networking data plane must remain fungible, so fixed-function offload technologies cannot be applied.

Data networking involves both hardware and software. On the software side, networking protocols are often designed for current (or near-term) hardware capabilities. Protocols often become widely adapted while at the same time networking hardware improves. Processors become more efficient while communication mediums gain reliability and increased capacity. However, over time, networking protocols may become less suitable for the hardware that is being developed.

Moreover, some capabilities of networking hardware have not been fully appreciated and realized. Smart NICs, for example FPGA (Field Programmable Gate Array) NICs, have become more common. These newer interfaces, like traditional NICs, provide physical and media connectivity. They also include additional processing capability, sometimes in the form of reconfigurable circuitry (e.g., FPGAs). These processing-augmented NICs may allow features of some protocols to be offloaded from the host's CPU (Central Processing Unit) to the NIC. Some smart NICs may even allow an entire transport protocol to be fully offloaded from a host's CPU to the smart NIC. However, this approach often requires significant host-side changes. For example, host-side software might need to be re-written in order to enable communicating directly with its NIC via a custom application programming interface (API) rather than via a standard transport protocol.

US 20160381189 describes a smart NIC with features that enable the smart NIC to operate as an in-line NIC between a host's NIC and a network. The smart NIC provides pass-through transmission of network flows for the host so that packets sent to and from the host would pass through the smart NIC. As a pass-through point, the smart NIC is able to accelerate performance of the pass-through network flows by analyzing packets, inserting packets, dropping packets, inserting or recognizing congestion information, and the like.

However, the main bottleneck in network applications is generally the I/O bandwidth. In a case wherein NICs are installed in servers, it is the PCI (Peripheral Component Interconnect) bandwidth that limits the maximal throughput of the system. A conventional PCI is a local computer bus used for connecting hardware devices in a computer. PCI is part of the PCI Local Bus standard. The PCI bus supports the functions found on a processor bus but in a standardized format that is independent of any particular processor's native bus.

The present disclosure seeks to solve the drawbacks described above.

SUMMARY

The disclosure may be summarized by referring to the appended claims.

It is an object of the present disclosure to provide a system and a method for improving performance of data processing.

It is another object of the present disclosure to provide a system and a method for forwarding only a portion of the data comprised in data packets received, thereby enabling saving of bandwidth, and consequently improving the system performance.

Other objects of the present disclosure will become apparent from the following description.

According to a first embodiment of the present disclosure, there is provided a communication system comprising at least one smart network interface card ("NIC") provided with a logic/programmable processor and a local memory, and a computing element, wherein a communication bus is used to connect the smart NIC and the computing element in order to enable forwarding of data there-between, wherein the system is characterized in that the smart NIC is configured to receive data packets, to extract data therefrom and to forward to the computing element along the communication bus less than all data comprised in the received data packets, and wherein the data being forwarded preferably comprises data required for making networking decisions (e.g. forwarding, routing) that relate to a respective data packet.

According to another embodiment, a plurality of the received data packets is stored at the local memory of the smart NIC.

By yet another embodiment, the extracted data is retrieved from data packet headers and/or from specific pre-defined locations of the data packet payloads.

In accordance with another embodiment, the data being forwarded to a software application residing at the computing element in dedicated descriptors which form together a MetaPacket.

According to still another embodiment, the dedicated descriptors comprise one or more members of the group that consists of: (1) memory location indications of where the packets are stored, (2) timestamps, (3) statistics, and (4) packets' validity flags.

According to another embodiment, the processor of the smart NIC is further configured to identify among the data packets received, one or more data packets which their entire content is required (e.g. packets which should be forwarded in their entirety to the software application CPU for carrying out control and/or management tasks), and to forward the identified data packets towards the computing element in their entirety.

In accordance with another embodiment, the processor of the smart NIC is further configured to apply an aging mechanism to packets that are stored at the local memory (e.g. by using the timestamp defined with respect to the descriptors referred to hereinabove).

By still another embodiment, upon processing a Meta-Packet by the software application residing at the computing element, the processed MetaPacket is forwarded along a reverse path of the communication bus, and used by the smart NIC processor to extract the corresponding data packet from the local memory and to process it according to the descriptors comprised in the processed MetaPacket (e.g. by using the address stored within the MetaPacket while taking into account other fields of that packet).

According to yet another embodiment, upon determining in accordance with updated information contained in the MetaPacket that the data packet should be forwarded from the smart NIC through an egress port which is different from the ingress port via which that data packet was received, forwarding the data packet to a driver, which in turn will forward the packet to its appropriate egress port.

In accordance with another embodiment, the communication system provided further comprising a driver configured to support two modes of operation, a transparent mode and an explicit mode.

When operating in the transparent mode, the driver is configured to reconstruct MetaPackets into virtual packets by using the metadata, while leaving the remaining of the packet nullified, and when operating in the explicit mode, the driver is configured to forward MetaPackets to a smart NIC aware application, which in turn is configured to operate on MetaPackets received from the driver.

According to another aspect of the disclosure, there is provided a method for use in a communication system that comprises at least one smart network interface card ("NIC") provided with a logic/programmable processor and a local memory, and a computing element, and wherein a communication bus is used to connect the smart NIC and the computing element to enable forwarding of data therebetween. The method comprises the steps of:

(i) extracting metadata from a packet that arrives to the smart NIC and placing the extracted metadata into a descriptors MetaPacket structure;

(ii) forwarding the descriptors MetaPacket structure to a software application CPU;

(iii) processing the descriptors MetaPacket structure by the software application CPU and returning the processed descriptors MetaPacket structure to the smart NIC;

(iv) Retrieving a respective data packet that had been stored from the local memory;

(v) Re-writing a header of the data packet according to updated metadata; and (vi) Forwarding the data packet via an egress port.

By still another embodiment of this aspect of the disclosure, the descriptors MetaPacket structure comprises at least one of: data packet's header (e.g. ETH, IP, UDP, TCP, etc.) to enable routing the packet, and an address within the local memory of the stored data packet to enable extracting the data packet later on from the local memory.

BRIEF DESCRIPTION OF THE DRAWINGS

The accompanying drawings, which are incorporated herein and constitute a part of this specification, illustrate several embodiments of the disclosure and, together with the description, serve to explain the principles of the embodiments disclosed herein.

DESCRIPTION OF EXEMPLARY EMBODIMENTS

Some of the specific details and values in the following detailed description refer to certain examples of the disclosure. However, this description is provided only by way of example and is not intended to limit the scope of the invention in any way. As will be appreciated by those skilled in the art, the claimed method and device may be implemented by using other methods that are known in the art per se. In addition, the described embodiments comprise different steps, not all of which are required in all embodiments of the invention. The scope of the invention can be summarized by referring to the appended claims.

Figure 1:
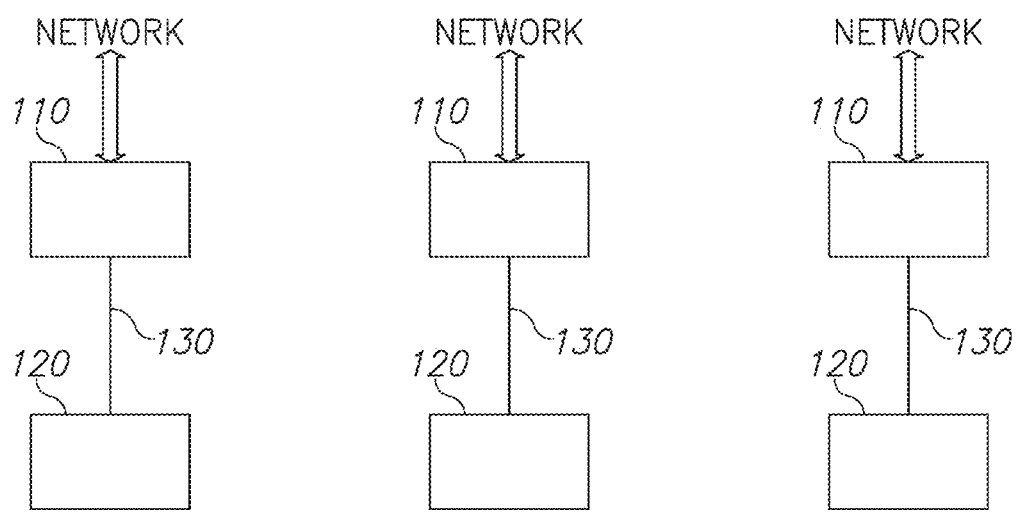
FIG. 1 demonstrates a block diagram of a system construed in accordance with an embodiment of the present invention.

FIG. 1 demonstrates a block diagram of a system (100) construed in accordance with an embodiment of the present invention. System 100 comprises a plurality of smart NICs (110), each preferably being a NIC provided with a logic/programmable processor and a local memory, computing elements (e.g. computing nodes) 120, and one or more buses 130 connecting there-between, such as the communication buses PCIE, OpenCAPI and the like.

Figure 2:
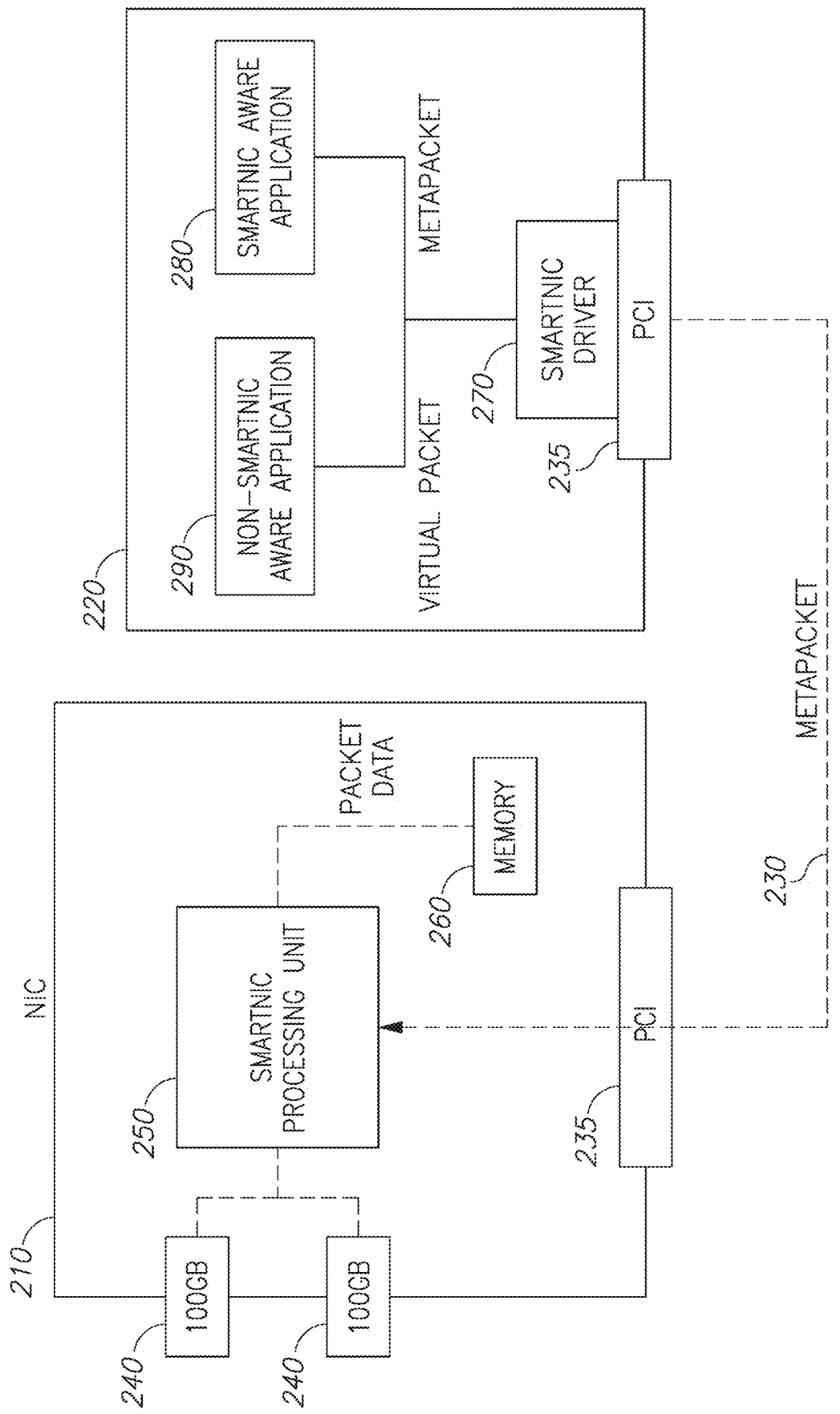
FIG. 2 illustrates a zoom-in view of part of the system demonstrated in FIG. 1.

FIG. 2 illustrates a zoom-in view of part of the system 100 demonstrated in FIG. 1, presenting a smart NIC 210, a computing element 220 and a bus 230 connecting between these two elements. In this example, a PCI 235 (Peripheral Component Interconnect) is used at each end of the communication bus. PCI is part of the PCI Local Bus standard. The PCI bus supports the functions found on a processor bus but in a standardized format that is independent of any particular processor's native bus.

Smart NIC 210 as depicted in the example illustrated in FIG. 2, comprises 2×100 Gb ports (240), configured as ingress/egress ports for receiving and forwarding communication packets, a processor 250 and optionally, a local memory 260.

When a data packet arrives at one of the ports 240, it is forwarded to processor 250, which is the smart NIC processing unit, for its processing. During this processing step the packet is stripped off from data which is not required for making networking decisions related to that packet. Most of the data that is relevant for taking packet forwarding/processing related decisions reside within the packet header, or at specific place(s) of the packet payload, in most cases there would be no need to transfer the entire packet from the smart NIC to the decision-making processor. Consequently, a substantial part of the bandwidth that would have been required had the entire packet been transferred, would now be saved. This in turn contributes significantly to the improvement of the overall system performance.

The original arriving packet is stored at local memory 260, whereas the data relevant for taking the forwarding/processing related decisions that has been stripped off from the arriving data, is forwarded towards computing element 220 along bus 230. This relevant data is forwarded in a dedicated descriptor that is referred to as MetaPacket.

As explained hereinabove, the MetaPacket includes all required descriptors to enable smart NIC 210 to process the packet at a later stage, and to do so at a fast manner, after the computing element 220 has completed the operations associated with that packet. These descriptors may include, but not limited to, one or more of the following: (1) the memory location of where the packet was stored, (2) timestamps, (3) statistics, (4) packet validity flags, and the like.

Thus, since only relevant data of each packet is forwarded over the two-way bus 230 (the packet descriptors), this greatly reduces the amount of data transferred to and from an application, which can either be a smart NIC aware application (280) or a non-smart NIC aware application (290), and in general makes the transfer performance to be dependent only on the data packets' arrival rate rather than to be dependent on both, the data packets' arrival rate as well as their size distribution.

In cases where the entire packet content is required (e.g. packets which should be forwarded to the processor for carrying out control and/or management tasks) a whitelist mechanism may preferably be implemented so that data packets that are whitelisted, shall be forwarded in their entirety (in their original format), and will be referred to later on as "whitelist packets". The term "whitelist" as used herein is used to denote a list or a register of entities that provide a particular privilege, service, mobility, access or recognition. Entities on this list will be accepted, approved and/or recognized.

By yet another embodiment, the processor of the smart NIC is further configured to apply to the data packets stored at the local memory, an aging mechanism (using the timestamp defined with respect to the descriptors referred to hereinabove), which will be cleared from the local memory upon their timeout, if no explicit request has been made to clear the packets from the local memory (e.g. to send the packets, reset the aging mechanism, or to explicitly delete the packets from the memory) before their respective timeout.

When a processed MetaPacket that has been forwarded along the reverse path of the two-way bus, reaches the smart NIC processor, a corresponding data packet may then be extracted from the local memory and processed according to the descriptors comprised in the MetaPacket (e.g. by using the address stored within the MetaPacket while taking into account other fields of that packet).

The extracted corresponding data packet may then be modified and processed in accordance with the updated information contained in the MetaPacket (e.g. the egress port through which is should be forwarded, whether the data packet should be discarded, etc.). In cases where the egress port is other than the smart NIC ingress port, the packet will be transferred to driver 270 which will then forward the data packet to its appropriate egress port.

Figure 3:
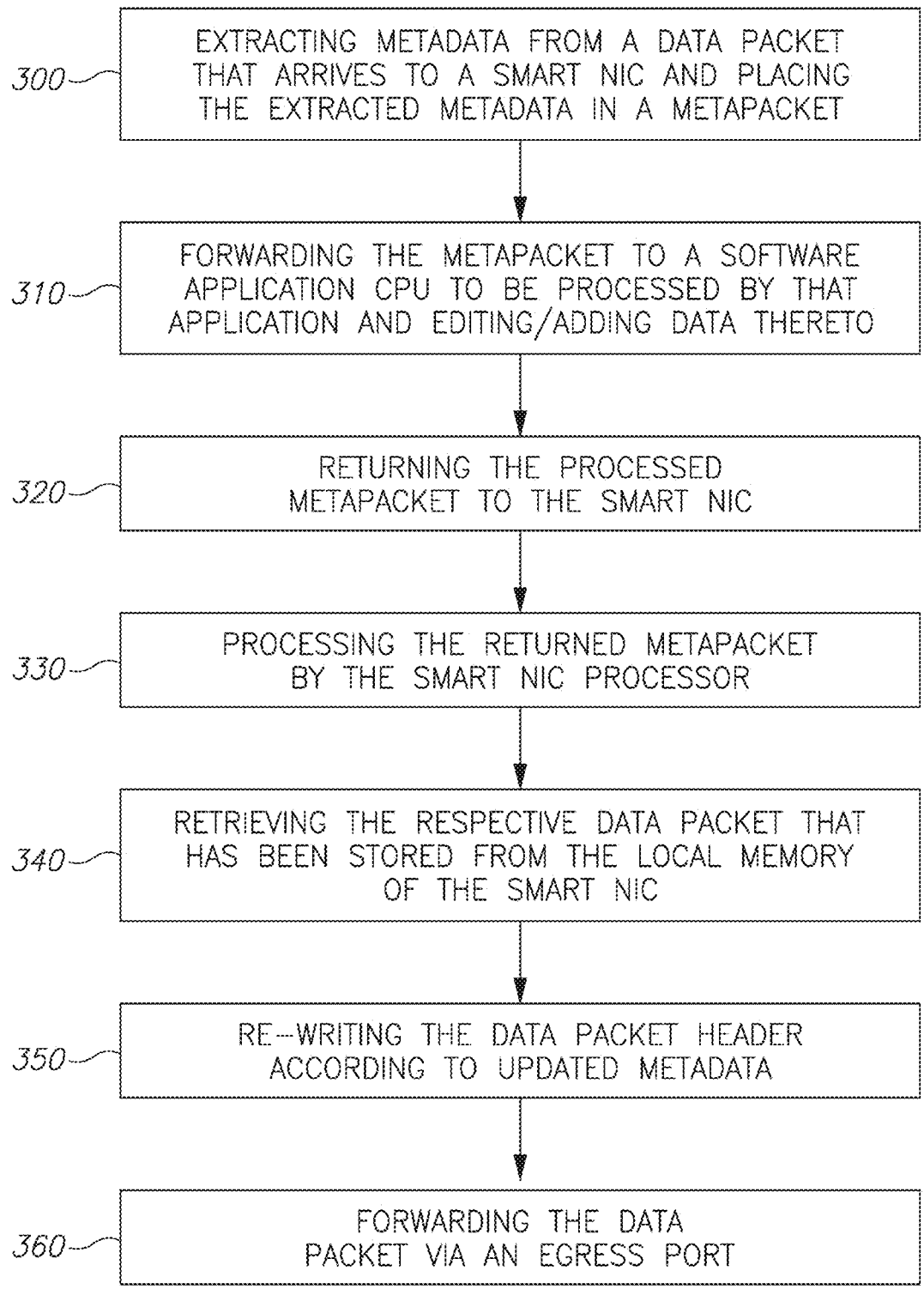
FIG. 3 demonstrates an example of a method for carrying out an embodiment of the present invention.

FIG. 3 demonstrates an example of a method for carrying out an embodiment of the present invention. The method exemplified comprises the following steps.

Extracting metadata from a data packet that arrives at the smart NIC processor and placing the extracted metadata into a descriptors MetaPacket structure (step 300). The data that is placed into the MetaPacket structure, may include for example the following: headers (ETH, IP, UDP, TCP, etc.) to enable routing the packet; packet memory address location to enable extracting the packet later on from the local memory.

On the other hand, whitelisted data packets are forwarded to a CPU and are not stored at the local memory, while other data packets are stored at the local memory. The MetaPacket as explained above is constructed from a respective packet's data and the corresponding memory address which is added in order to enable retrieval of the packet from the memory later on. After constructing the MetaPacket, it is forwarded to an application CPU (280, FIG. 2), so that MetaPacket/VirtualPacket is processed by the respective application and relevant metadata is edited/added (step 310). The respective MetaPacket/VirtualPacket is then returned to the smart NIC (step 320).

A packet that should be forwarded to an egress port is processed by the smart NIC processor (step 330) by:
 a. Extracting the data packet from the local memory by using the respective stored address (step 340);
 b. Re-writing the data packer's header according to updated metadata (step 350); and
 c. Forwarding the data packet away via an appropriate interface (step 360). If the packet should be forwarded via a different NIC, it is first forwarded to driver 270, and the latter is used to forward it to a relevant NIC.

According to still another embodiment of the present invention the smart NIC driver is preferably configured to support two modes of operation, namely a transparent mode and an explicit mode.

When operating in the transparent mode, the smart NIC driver is configured to reconstruct MetaPackets into virtual packets by using the metadata, while leaving the remaining of the packet nullified.

In the reverse direction, the driver transforms the virtual packets into MetaPackets. Thereby, implementing the transparent mode enables non-smart NIC aware applications to run while using the smart NIC logic.

On the other hand, in the explicit mode, the smart NIC driver forwards the MetaPackets to a smart NIC aware application, which will then operate on the MetaPackets received from the driver.

According to another embodiment of the disclosure, the method described hereinabove can be used in conjunction with different bus traffic optimization strategies, such as grouping packets, in-lining, etc.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A communication system comprising at least one smart network interface card ("NIC") provided with a logic/programmable processor and a local memory, and a computing element, wherein a communication bus is used to connect said smart NIC and said computing element to enable forwarding data there-between,
 wherein said system is characterized in that said smart NIC is configured to receive a data packet to extract metadata therefrom, wherein said metadata resides within said data packet header and/or at one or more specific locations within the data packet payload, place the extracted metadata into a descriptors MetaPacket structure, and forward the descriptors MetaPacket structure, to said computing element along said communication bus, thereby forwarding less than all of said data packet to said computing element; and wherein said system is further characterized in that the computing element is configured to process said descriptors MetaPacket structure and to return the processed descriptors MetaPacket structure to the smart NIC.

2. The system of claim 1, wherein upon receiving the processed extracted metadata, said smart NIC is further configured to extract a respective data packet that had been stored at the local memory and re-write a header of the retrieved data packet according to the processed metadata.

3. The system of claim 1, wherein a plurality of the received data packets is stored at said local memory of the smart NIC.

4. The system of claim 1, wherein the dedicated descriptors comprise one or more members of the group that consists of: (1) the memory location of where the packet was stored, (2) timestamps, (3) statistics, and (4) packet validity flags.

5. The system of claim 1, wherein the smart NIC processor is further configured to receive a plurality of data packets and to identify one or more data packets from among the plurality of data packets received, for which an entire content is required, and to forward the entire content of said identified data packets towards the computing element.

6. The system of claim 1, wherein the smart NIC processor is further configured to apply an aging mechanism to packets that are stored at the local memory of said smart NIC.

7. The system of claim 1, wherein upon processing a descriptors MetaPacket structure by a software application residing at the computing element, the processed descriptors MetaPacket structure is forwarded along a reverse path of said communication bus, to be used by the smart NIC processor in extracting a corresponding data packet from the local memory and processing the extracted corresponding data packet according to the descriptors comprised in the processed descriptors MetaPacket structure.

8. The system of claim 1, wherein upon determining in accordance with updated information contained in the descriptors MetaPacket structure that the data packet should be forwarded from the smart NIC through an egress port which is other than the an ingress port via which that data packet was received, forwarding the data packet to a driver which in turn forwards the data packet to an appropriate egress port.

9. The system of claim 1, further comprising a driver configured to support two modes of operation, a transparent mode and an explicit mode.

10. A communication system comprising at least one smart network interface card ("NIC") provided with a logic/programmable processor and a local memory, and a computing element, wherein a communication bus is used to connect said smart NIC and said computing element to enable forwarding data there-between, wherein said system is characterized in that said smart NIC is configured to receive data packets, to extract data therefrom and to forward less than all data comprised in the received data packets, to said computer element along said communication bus, wherein said communication system further comprises a driver configured to support two modes of operation, a transparent mode and an explicit mode, and wherein the driver is configured to reconstruct MetaPackets by using metadata associated therewith, while leaving the remaining of the packet nullified.

11. The system of claim 10, wherein said driver is further configured to forward MetaPackets to the smart NIC, which in turn is configured to operate on the MetaPackets received from the driver.

12. A method for use in a communication system that comprises at least one smart network interface card ("NIC") provided with a logic/programmable processor and a local memory, and a computing element, and wherein a communication bus is used to connect said smart NIC and said computing element to enable forwarding of data there-between, said method comprises the steps of:

(i) extracting metadata from a data packet that arrives at the smart NIC and placing the extracted metadata into a descriptors MetaPacket structure;

(ii) forwarding the descriptors MetaPacket structure to a software application CPU;

(iii) processing the descriptors MetaPacket structure by the software application CPU and returning the processed descriptors MetaPacket structure to the smart NIC;

(iv) retrieving a respective data packet that has been stored from the local memory;

(v) re-writing the data packet's header according to updated metadata; and (vi) forwarding the data packet via an egress port.

13. The method of claim 12, wherein said descriptors MetaPacket structure comprises at least one of: a data packet's header and an address within the local memory of the stored data packet.

* * * * *